United States Patent
Arndt et al.

(10) Patent No.: US 6,511,134 B2
(45) Date of Patent: *Jan. 28, 2003

(54) PARKING BRAKE SWITCH FOR AN ELECTRO-HYDRAULIC BRAKE SYSTEM

(75) Inventors: Robin S. Arndt, Joliet; Andrew O. Fonkalsrud, Yorkville; John T. Nebgen, Rome, all of IL (US); Michael G. Seil, Woodland Park, CO (US); Ricky D. Vance, Washington, IL (US)

(73) Assignee: Caterpillar Inc., Peoria, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/487,375

(22) Filed: Jan. 18, 2000

(65) Prior Publication Data

US 2002/0040842 A1 Apr. 11, 2002

(51) Int. Cl.[7] ............................................... B60T 13/66
(52) U.S. Cl. ............................. 303/20; 303/3; 303/15
(58) Field of Search .............................. 303/20, 7, 9, 3, 303/15, 123; 340/452; 200/538, 522, 341, 345, 520

(56) References Cited

U.S. PATENT DOCUMENTS

| | | | |
|---|---|---|---|
| 3,439,322 A | * | 4/1969 | Gardner ..................... 340/452 |
| 3,910,372 A | * | 10/1975 | Mozzar ..................... 340/505 |
| 3,915,512 A | | 10/1975 | Chabala |
| 4,048,607 A | | 9/1977 | Smorzaniuk |
| 4,181,907 A | | 1/1980 | Esposito et al. |
| 4,660,696 A | | 4/1987 | Kusaka |
| 4,769,554 A | * | 9/1988 | Reinartz et al. ............ 340/452 |
| 4,855,699 A | | 8/1989 | Hoegh |
| 4,877,294 A | | 10/1989 | Kuhn et al. |
| 5,000,519 A | | 3/1991 | Moore |
| 5,085,489 A | | 2/1992 | Emig et al. |
| 5,411,324 A | | 5/1995 | Zydek et al. |
| 5,526,264 A | | 6/1996 | Niggemann et al. |
| 5,531,512 A | | 7/1996 | Thompson |
| 5,631,614 A | | 5/1997 | Goodman et al. |
| 5,704,693 A | | 1/1998 | Mackiewicz |
| 5,720,385 A | * | 2/1998 | Uchiyama ................... 200/549 |

FOREIGN PATENT DOCUMENTS

| | | | | |
|---|---|---|---|---|
| JP | 5576746 A | * | 6/1980 | |
| JP | 5579740 A | * | 6/1980 | |
| JP | 57138453 A | * | 2/1981 | |
| JP | 57138454 A | * | 8/1982 | |
| JP | 57140262 A | * | 8/1983 | |

* cited by examiner

Primary Examiner—Jack Lavinder
Assistant Examiner—Melanie Torres
(74) Attorney, Agent, or Firm—Blackwell Sanders

(57) ABSTRACT

A parking brake switch for a vehicle including a switch having a contacting surface, the switch being positioned between an actuated state and a deactuated state, a first contact connected to a brake valve associated with an electro-hydraulic braking system, a second contact connected to a pair of electronic control modules, and a third contact connected to the pair of electronic control modules and a coil, the contacting surface being adapted to engage all of the contacts when the switch is in the actuated state.

21 Claims, 2 Drawing Sheets

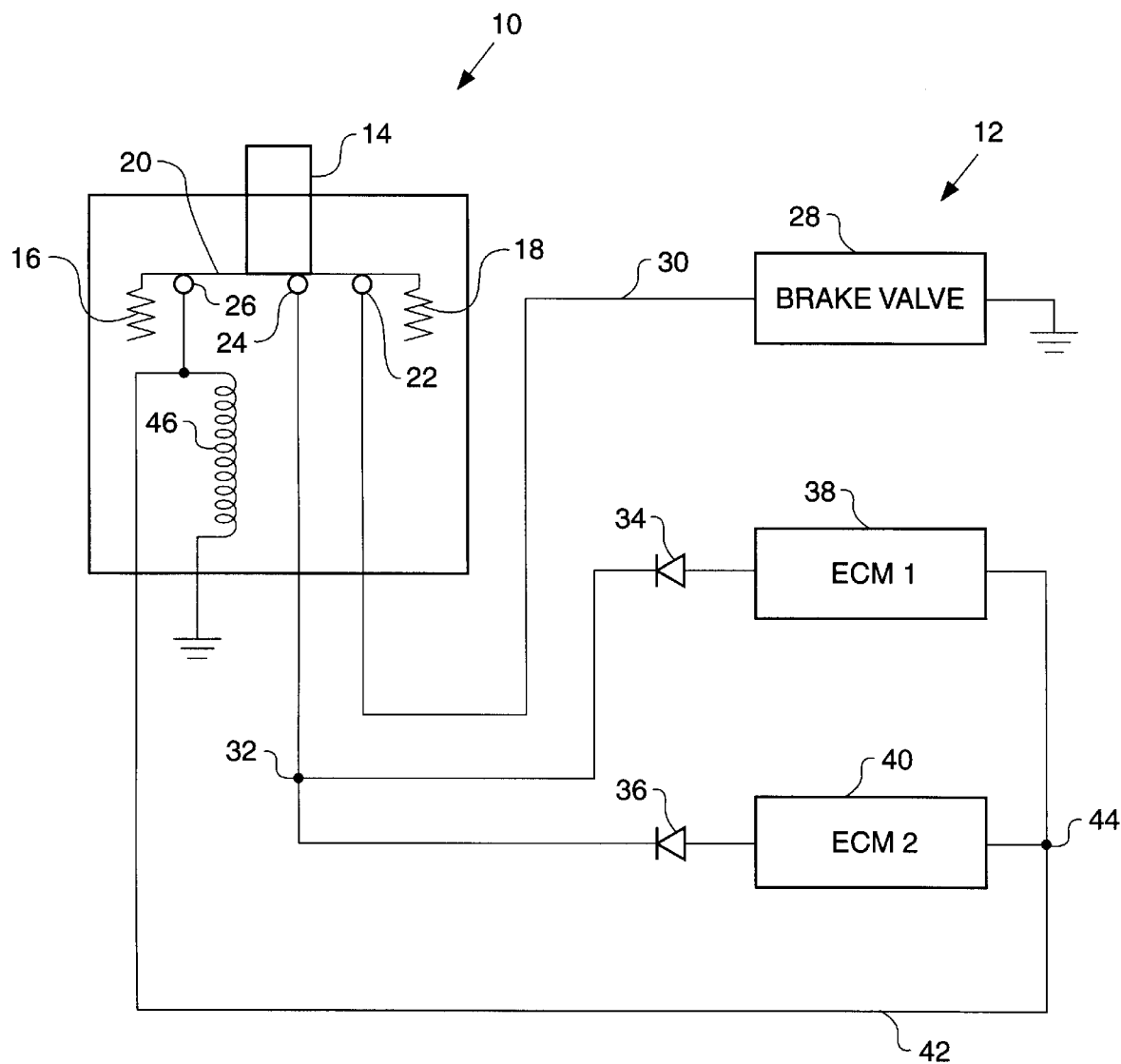
Fig_2_

PARKING BRAKE SWITCH FOR AN ELECTRO-HYDRAULIC BRAKE SYSTEM

TECHNICAL FIELD

This invention relates generally to a brake system for a construction vehicle, and more particularly, to a parking brake switch for an electro-hydraulic brake system.

BACKGROUND ART

In a conventional electro-hydraulic brake system for a vehicle, such as a construction vehicle, the parking brake associated with such vehicle is typically automatically operated and engaged when stored energy for the service brake system is depleted. In contrast, the parking brake can not be deactivated or disengaged until the energy storage device for the service brake system is charged to an extent as to provide for satisfactory service brake application. During an electrical power failure, it is also possible that the brake system may fail and the parking brake may not be maintained in its operator selected (released) state. There are also situations that may occur, such as a single electrical failure, in which the parking brake may be automatically applied while the vehicle is moving. These are all disadvantages associated with a conventional electro-hydraulic brake system.

Accordingly, the present invention is directed to overcoming one or more of the problems as set forth above.

DISCLOSURE OF THE INVENTION

In one aspect of the present invention, a parking brake switch for a vehicle includes at least three separate contacts and a contacting surface, the switch being positioned between an actuated state and a deactuated state, a first contact being connected to a brake valve associated with an electro-hydraulic braking system, a second contact being connected to a pair of electronic control modules, and a third contact being connected to the pair of electronic control modules and to a coil, the contacting surface of the present switch being adapted to engage all of the first, second, and third contacts when the switch is in the actuated state.

In another aspect of the present invention, a parking brake switch for a vehicle for controlling operation of a parking brake associated with an electro-hydraulic braking system includes an operating portion and a contacting surface, the switch being biased between an activated state and a deactivated state, a first contact connected to a brake valve associated with the electro-hydraulic braking system, a second contact connected to a first electronic control module and a second electronic control module, and a third contact connected to the first and second electronic control modules, the contacting surface of the present switch being adapted to engage all of the contacts when the switch is in the actuated state.

BRIEF DESCRIPTION OF THE DRAWINGS

FIG. 2 is a partial schematic and partial block diagram of the parking brake switch shown in FIG. 1 in an actuated condition.

BEST MODE FOR CARRYING OUT THE INVENTION

Figure 1:
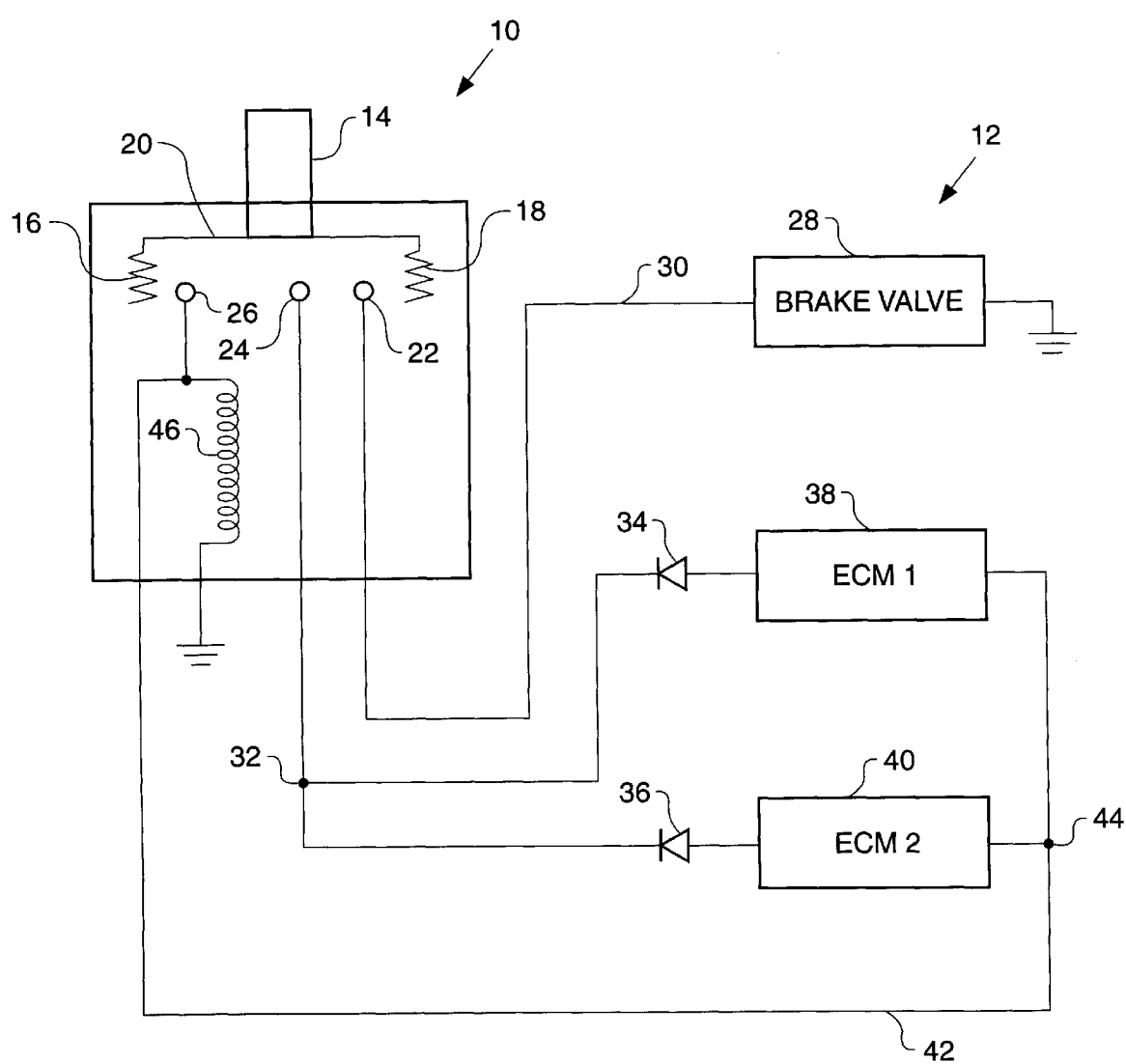
FIG. 1 is a partial schematic and partial block diagram of a parking brake switch for an electro-hydraulic brake system constructed according to the present invention.

Referring now to the drawings, FIG. 1 illustrates a parking brake switch 10 for an electro-hydraulic brake system 12. The parking brake switch 10, which may be incorporated within a vehicle such as a construction vehicle, includes an operator interface portion 14 which is biased between an actuated state and a deactuated state by a pair of biasing springs 16 and 18. The operator interface portion 14 has a contacting element 20 which is capable of contacting contacts 22, 24 and 26. The contact 22 is connected to a brake valve 28 via a lead 30. The brake valve 28 may operate a parking brake (not shown) which is part of the electro-hydraulic brake system 12. The contact 24 is shown connected to a node 32 and through a pair of diodes 34 and 36 to a pair of electronic control modules (ECMs) 38 and 40 respectively.

The ECM 38, which is indicated as being ECM1, is the primary ECM for controlling operation of the vehicle (not shown). The ECM 40, which is further indicated as ECM2, is a secondary ECM which may be a redundant ECM or may control various other operations of the vehicle. The ECMs 38 and 40 are capable of receiving various inputs or signals from other vehicle systems or sensors (not shown) associated with control of the operation of the vehicle. Examples of the ECMs 38 and 40 are microprocessor based systems having memory and programs stored therein for operating or controlling the particular vehicle. The ECMs 38 and 40 provide power to the contact 24 of switch 10, such as 24 volts, through the diodes 34 and 36. The ECMs 38 and 40 are shown connected in parallel with the switch 10 and either of the ECMs 38 or 40 is capable of providing power to the switch 10. Each of the ECMs 38 and 40 are further connected to the switch 10 via a lead 42 at a node 44 to the contact 26. The connection of the ECMs 38 and 40 via the lead 42 provides feedback to the ECMs 38 and 40 as to what state, actuated or deactuated, the switch 10 is in. The contact 26 is also connected to an inductor or coil 46 which is used to engage and hold the contacting surface 20 to the contacts 22, 24 and 26 until both of the ECMs 38 and 40 stop supplying power, either manual deactivation of the switch or dual failure of the ECMs 38 and 40. This also provides a physical and visual indication to the operator of the status of the parking brake. Since both ECMs 38 and 40 continuously supply power to the switch 10, failure of one ECM would not effect the operation of switch 10.

The switch 10 is shown in FIG. 1 in its deactivated or deactuated state, e.g., the parking brake is released. In particular, in the deactivated state, the contacting surface 20 is not contacting or engaged with any of the contacts 22, 24 and 26. Since no connection is made between the ECMs 38 and 40 and the contacting surface 20, no power is being supplied to the brake valve 28 through the contact 22. At this point the parking brake (not shown) associated with the brake system 12 would not be engaged.

Referring now to FIG. 2, the switch 10 is illustrated as being in its activated or actuated state. In this state the operator of the vehicle has pressed down on the operator interface portion 14 and the contacting surface 20 is now engaged with all of the contacts 22, 24 and 26. Power is now being supplied to the contact 26 from either or both of the ECMs 38 and 40. Power is also being provided to the brake valve 28 over the lead 30. Further, a signal is now being sent from the contact 26 to the node 44 to each of the ECMs 38 and 40. This signal is indicative of the switch 10 being in its activated state.

Additional features incorporated with use of the switch 10 may include the following. For example, at startup of the vehicle engine, the ECMs 38 and 40 do not provide for engagement of the parking brake switch 10 to provide power to the brake valve 28 to retract the parking brake unless there are no faults associated with the ECMs 38 and 40, and no faults associated with the vehicle which are detected by the ECMs 38 and 40. In addition, the ECMs 38 and 40 may be wired to the switch 10 in parity, and a parking brake solenoid, which is part of the electro-hydraulic brake system 12, and the switch 10 must always be in the same state. Also, a single failure in the wiring of the switch 10 may prevent the parking brake from being released due to the fact that no power is being supplied to the brake valve 28. Additionally, battery backup and the ECMs 38 and 40 will continue to supply power to the switch 10 until accumulators associated with the electro-hydraulic brake system 12 drain down pressure and/or a predetermined time limit is met and the speed of the vehicle is zero. In this particular situation, the parking brake will be applied automatically only when the above parameters are met.

INDUSTRIAL APPLICABILITY

As described herein, a parking brake switch for an electro-hydraulic brake system constructed according to the present invention is useful in the operation of a wide variety of different types of vehicles such as construction vehicles. In particular, the parking brake switch interacts with the primary and the secondary ECM to maintain the parking brake switch in its operator selected state during a battery, wiring, or ECM failure. The switch 10 may also provide an operator with both a visual and physical indication of the status of the parking brake. The switch 10 may also be applied to other types of electro-hydraulic systems. For example, the switch 10 could be employed on a logger to control the clamping of the logging forks. The switch 10 again may be a positive indication to the operator of the logger as to the status of power from the switch 10. Additionally, the switch 10 may also be constructed to operate in conjunction with dual or redundant ECMs used to operate and control the logger.

As is evident from the foregoing description, certain aspects of the present invention are not limited to the particular details of the examples illustrated herein, and it is therefore contemplated that other modifications and applications will occur to those skilled in the art. It is accordingly intended that the claims shall cover all such modifications and applications that do not depart from the spirit and scope of the present invention.

Other aspects, objects and advantages of the present invention can be obtained from a study of the drawings, the disclosure and the appended claims.

What is claimed is:

1. A parking brake switch for a vehicle comprising:
   a switch having a contacting surface, the switch being positioned between an actuated state and a deactuated state;
   a first contact connected to a brake valve associated with an electro-hydraulic braking system;
   a second contact connected to a pair of electronic control modules;
   a third contact connected to the pair of electronic control modules and a coil; and
   the contacting surface adapted to engage all of the contacts when the switch is in the actuated state.

2. The parking brake switch of claim 1 wherein each of the electronic control modules provides power to the second contact.

3. A parking brake switch for a vehicle comprising:
   a switch having a contacting surface, the switch being positioned between an actuated state and a deactuated state;
   a first contact connected to a brake valve associated with an electro-hydraulic braking system;
   a second contact connected to a pair of electronic control modules;
   a third contact connected to the pair of electronic control modules and a coil, the connection between the third contact and the pair of electronic control modules providing a feedback path for the electronic control modules to monitor the state of the parking brake switch; and
   the contacting surface adapted to engage all of the contacts when the switch is in the actuated state.

4. The parking brake switch of claim 1 wherein each of the electronic control modules provides power to the second contact and to the brake valve whenever the contacting surface is engaging the contacts.

5. The parking brake switch of claim 1 wherein the electronic control modules are connected in parity with the parking brake switch.

6. The parking brake switch of claim 1 wherein the coil is capable of holding the contacting surface in engagement with the contacts.

7. A parking brake switch for a vehicle comprising:
   a switch having a contacting surface, the switch being positioned between an actuated state and a deactuated state;
   a first contact connected to a brake valve associated with an electro-hydraulic braking system;
   a second contact connected to a pair of electronic control modules;
   a third contact connected to the pair of electronic control modules and a coil, the coil capable of holding the contacting surface in engagement with the contacts, and the coil holding the contacting surface in engagement with the contacts until both of the electronic control modules lose power; and
   the contacting surface adapted to engage all of the contacts when the switch is in the actuated state.

8. The parking brake switch of claim 1 wherein the electronic control modules are connected in parallel with the parking brake switch.

9. The parking brake switch of claim 1 wherein each of the electronic control modules has a diode connected between the electronic control module and the parking brake switch.

10. A parking brake switch for a vehicle for controlling operation of a parking brake of an electro-hydraulic braking system comprising:
    a switch having an operating portion and a contacting surface, the switch being biased between an activated state and a deactivated state;
    a first contact connected to a brake valve associated with the electro-hydraulic braking system;
    a second contact connected to a first electronic control module and a second electronic control module;
    a third contact connected to the first and second of electronic control modules; and
    the contacting surface adapted to engage all of the contacts when the switch is in the actuated state.

11. The parking brake switch of claim 10 further including a coil connected to the third contact, the coil being capable of holding the contacting surface in engagement with the contacts.

12. The parking brake switch of claim 10 wherein the first and second electronic control modules provide power to the second contact.

13. A parking brake switch for a vehicle for controlling operation of a parking brake of an electro-hydraulic braking system comprising:

a switch having an operating portion and a contacting surface, the switch being biased between an activated state and a deactivated state;

a first contact connected to a brake valve associated with the electro-hydraulic braking system;

a second contact connected to a first electronic control module and a second electronic control module;

a third contact connected to the first and second of electronic control modules, the connection between the third contact and the first and second electronic control modules providing a feedback path for the first and second electronic control modules to monitor the state of the parking brake switch; and the contacting surface adapted to engage all of the contacts when the switch is in the actuated state.

14. The parking brake switch of claim 10 wherein the first and second electronic control modules provide power to the second contact and to the brake valve whenever the contacting surface is engaging the contacts.

15. The parking brake switch of claim 10 wherein the first and second electronic control modules are connected in parallel with the parking brake switch.

16. The parking brake switch of claim 10 wherein the first and second electronic control modules each have a diode connected between the electronic control module and the parking brake switch.

17. The parking brake switch of claim 10 wherein the switch is spring biased.

18. A method of operating a parking brake switch to actuate a parking brake which is part of a braking system of a vehicle, the method comprising the steps of:

switching a switch between an deactuated stated and a actuated state in order to operate the parking brake, the switch having a contacting surface;

connecting a first contact to a brake valve associated with the braking system;

connecting a second contact to a pair of electronic control modules;

connecting a third contact to the pair of electronic control modules and a coil; and engaging all of the contacts to the contacting surface of the switch when the switch is in the actuated state in order to operate the parking brake.

19. The method of claim 18 further comprising the step of biasing the contacting surface into engagement with the contacts when the switch is switched into the actuated stated.

20. The method of claim 18 further comprising the step of biasing the contacting surface into disengagement with the contacts when the switch is switched into the deactuated state.

21. A method of operating a switch for controlling an electro-hydraulic system comprising the steps of:

moving an operator interface between an actuated and a deactuated state, the operator interface having a contacting element;

engaging the contacting with a first contact, the first contact connected to the electro-hydraulic system when the operator interface is in the actuated state;

engaging the contacting element with a second contact, the second contact connected to at least one electronic control module when the operator interface is in the actuated state;

engaging the contacting element with a third contact when the operator interface is in the actuated state, the third contact connected to the at least one electronic control module and a coil;

supplying power from at least one electronic control module to the electro-hydraulic system through at least one of the contacts; and maintaining the engagement of the contacting element and the plurality of contacts while the operator interface is in the actuated state.

* * * * *